United States Patent [19]
Kato et al.

[11] Patent Number: 4,553,823
[45] Date of Patent: Nov. 19, 1985

[54] LARGE RELATIVE APERTURE OBJECTIVE LENS

[75] Inventors: Masatake Kato, Tokyo; Shigeru Hashimoto, Kanagawa, both of Japan

[73] Assignee: Canon Kabushiki Kaisha, Tokyo, Japan

[21] Appl. No.: 375,672

[22] Filed: May 6, 1982

[30] Foreign Application Priority Data
May 25, 1981 [JP] Japan ............................. 56-79029

[51] Int. Cl.⁴ ........................... G02B 9/62; G02B 9/64
[52] U.S. Cl. ............................... 350/463; 350/464
[58] Field of Search ............................. 350/463, 464

[56] References Cited
U.S. PATENT DOCUMENTS
4,392,724 7/1983 Hamanishi ..................... 350/463

Primary Examiner—John K. Corbin
Assistant Examiner—Rebecca D. Gass
Attorney, Agent, or Firm—Toren, McGeady, Stanger, Goldberg & Kiel

[57] ABSTRACT

A large relative aperture objective lens having three lens groups of positive power with said three lens groups being all moved forward to effect focusing from an infinitely distant object to close objects. The three lens groups, being named from front to rear, 1st, 2nd and 3rd lens groups successively, have the amounts of forward movement of the 1st, 2nd and 3rd lens groups made progressively smaller. Accordingly, good stability of aberration correction throughout the extended focusing range is achieved.

2 Claims, 30 Drawing Figures

FIG.4a  FIG.4b  FIG.4c
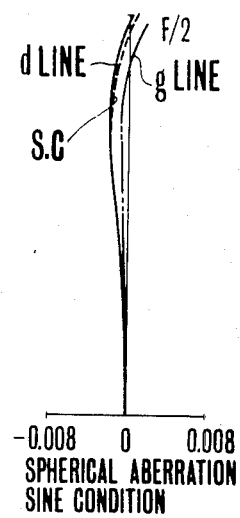
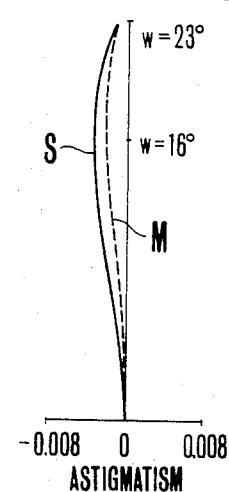
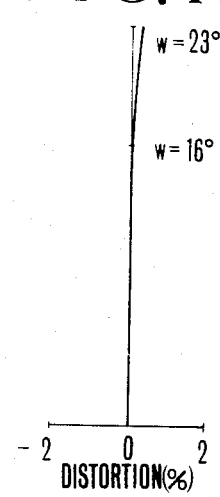
FIG.4d
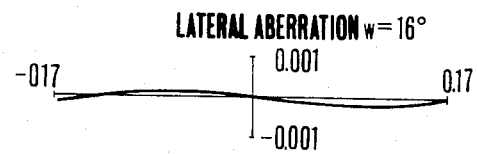
FIG.5a  FIG.5b  FIG.5c
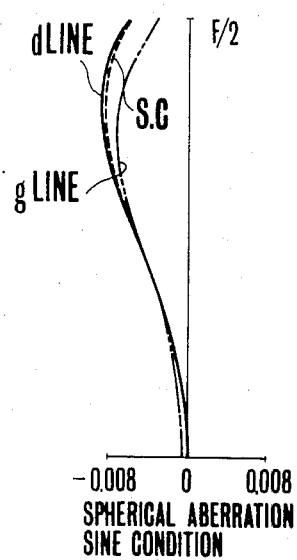
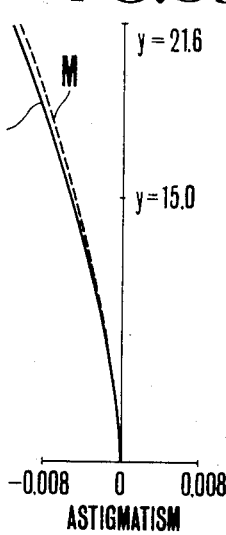
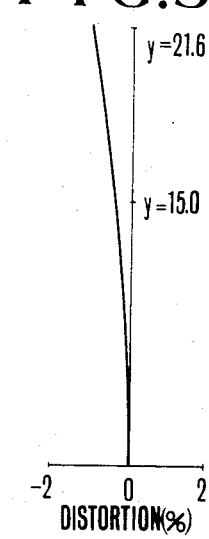
FIG.5d
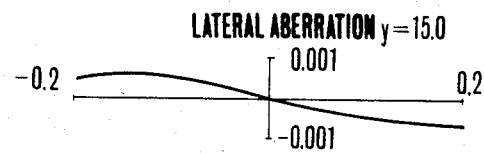

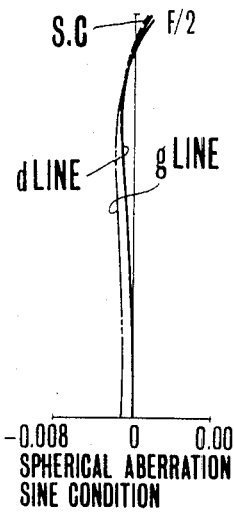
FIG.6a
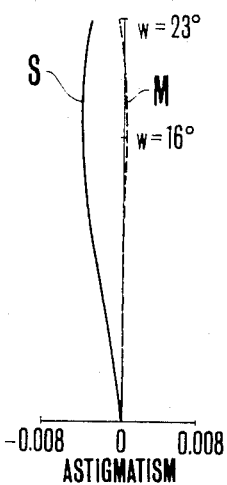
FIG.6b
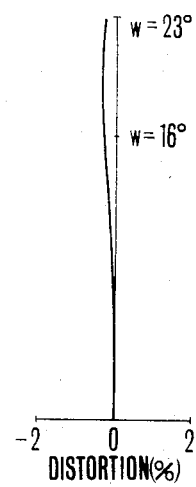
FIG.6c
FIG.6d
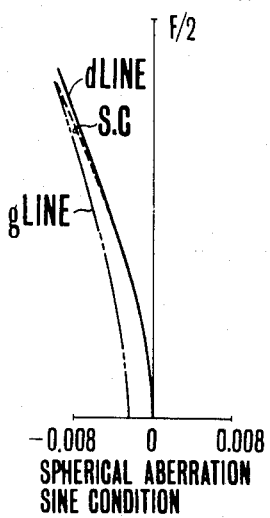
FIG.7a
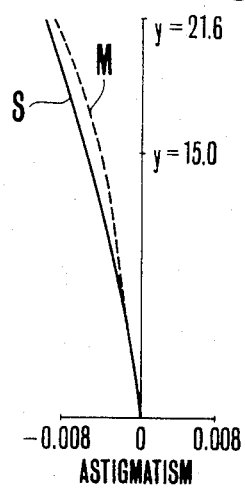
FIG.7b
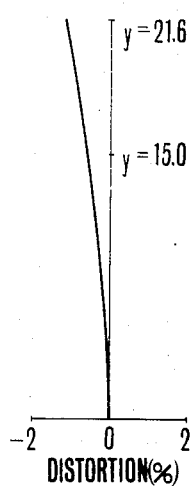
FIG.7c
FIG.7d
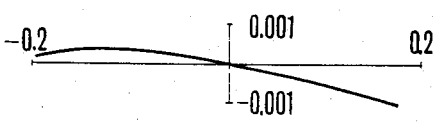

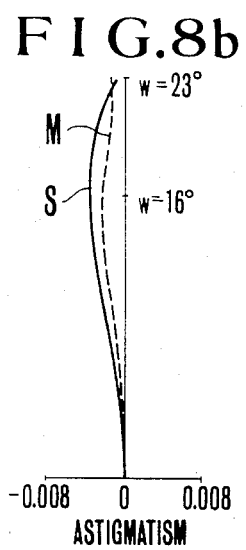
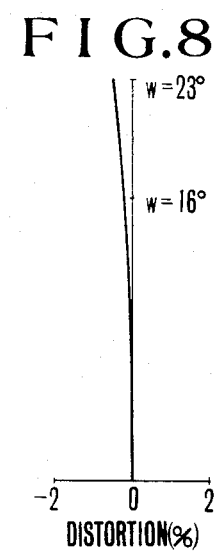
FIG.8a  FIG.8b  FIG.8c
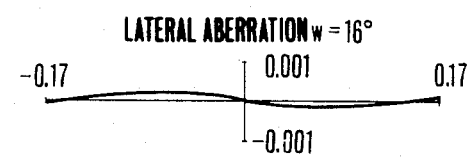
FIG.8d
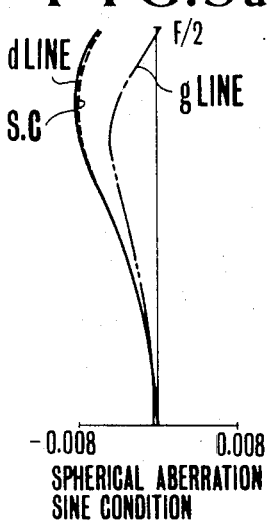
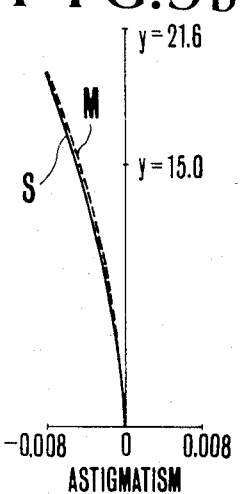
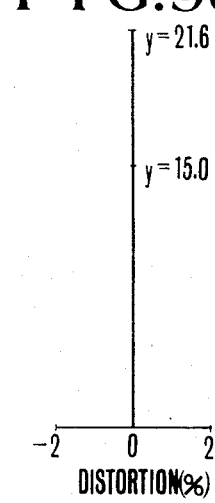
FIG.9a  FIG.9b  FIG.9c
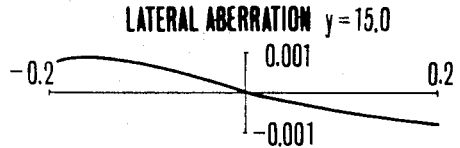
FIG.9d

LARGE RELATIVE APERTURE OBJECTIVE LENS

BACKGROUND OF THE INVENTION

1. Field of the Invention

This invention relates to large relative aperture objective lenses, and, more particularly, to objective lenses of increased relative aperture while still permitting high grade imaging performance throughout an extended focusing range from infinity to very short object distances.

2. Description of the Prior Art

In the past, the photographic objectives called macro, or micro lenses which are adapted to be mainly used in closeup shooting and also capable of focusing up to infinity, when focused down to close object distances have suffered darkening of the effective F-number. This led to the production of a shade in the split prism area on the focusing screen. Therefore, the photographer had to turn to the surrounding or mat area for focusing purposes. Also, since the depth of field became shallow, it became very difficult to detect when the objective lens is focused to an optimum in-focus position. For this reason, there is an increasing demand for a larger relative aperture or fast objective lens.

However, since the range of variation of the image magnification is wide as compared with the normal photographic objective, aberrations vary to large degree with focusing. This aberration variation becomes prominent when the relative aperture is increased. Even in case, as usual, the start point for design on the image magnification is set in about 1/10 times, it is found that as the image magnification approaches 1/5 times or larger, the spherical aberration and curvature of the field becomes under-corrected, and asymmetric aberrations for off-axis rays are produced. Particularly regarding the outward coma in the intermediate zone to the marginal zone of the image format, for a subject of fine patterns, the image is largely blurred to impair the degree of sharpness, thus the photographer is obliged to use the objective with the diaphragm closed down. As it is also required to remove the distortion, it follows from these points that the symmetric lens type, for example, Gauss type with the inclusion of the modified Gauss type is suited for macro lenses of large relative aperture, and has found many uses.

With the ordinary Gauss type lens, however, in closeup shooting, the paraxial ray becomes stronger in divergence than when focused at infinity so that the height of incidence on the rear lens component becomes higher. The result of this is that the spherical aberration is largely under-corrected by the positive refractive power of the rear component. On the other hand, as regards the off-axis coma, because focusing down to shorter object distances is effected by moving the lens system forwards as a whole, the principal ray to the maximum image height makes a smaller angle with the optical axis so that the upper and lower portions of the image bearing beam are refracted more weakly by the rear lens component than when in shooting at an infinitely distant object, thereby outward coma is produced.

As a means for compensating for this drawback, it has already been known in the art, as disclosed in Japanese Laid Open Patent Sho Nos. 50-138823, 52-7723, 53-87728 and 53-10425 and U.S. Pat. Nos. 3,884,557 and 4,260,223, to change a certain air separation between lens members, as the entire lens system is moved forward, away from the image plane, with some advantage. However, this method, though being favorable to the closeup shooting of low image magnification, has drawbacks that, as the image magnification increases, the state of correction of the image aberrations cannot be maintained sufficiently acceptable. Further while the off-axis asymmetric aberrations are well corrected, the other various aberrations are somewhat sacrificed. The problem of achieving a large increase in the relative aperture while maintaining good stability of aberration correction throughout the extended focusing range has not been solved yet.

SUMMARY OF THE INVENTION

An object of the present invention is to provide a photographic objective lens with means of relatively simple form making it possible to achieve a much-desired increase in the relative aperture while still permitting good correction of aberrations even at extraordinarily increased magnifications.

One of the features of the present invention is the arrangement of three lens groups each having a positive refractive power in such a way that, as the lens groups are numbered consecutively from front to rear, when focusing is effected down from infinity to shorter object distances, the three lens groups are moved axially forward, wherein the 2nd lens group is made to move faster than the 3rd lens group, and the 1st lens group is made to move faster than the 2nd lens group.

BRIEF DESCRIPTION OF THE DRAWINGS

FIGS. 4-a to d and 5-a to d are graphic representations of the various aberrations of the objective of FIG. 1.

FIGS. 6-a to d and 7-a to d are graphic representations of the various aberrations of the objective of FIG. 2.

FIGS. 8-a to d and 9-a to d are graphic representations of the various aberrations of the objective of FIG. 3.

DESCRIPTION OF THE PREFERRED EMBODIMENTS

The present invention will next be described in connection with embodiments thereof by reference to the drawings.

Figure 1A:
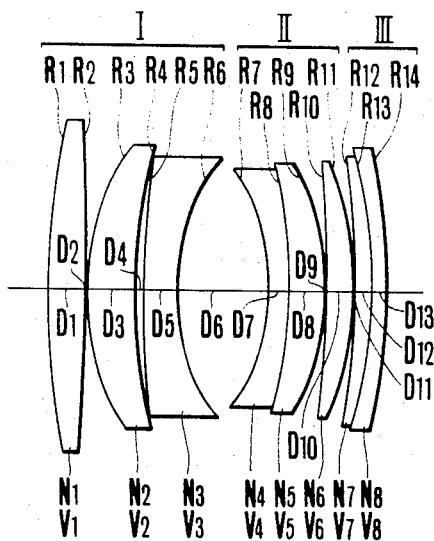
FIGS. 1-a and 1-b, FIGS. 2-a and 2-b, and FIGS. 3-a and 3-b are lens block diagrams of embodiments of the present invention respectively.
Figure 1B:
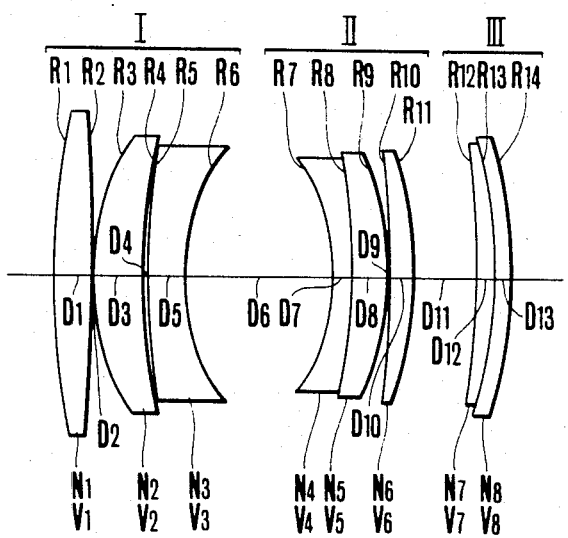
Figure 2A:
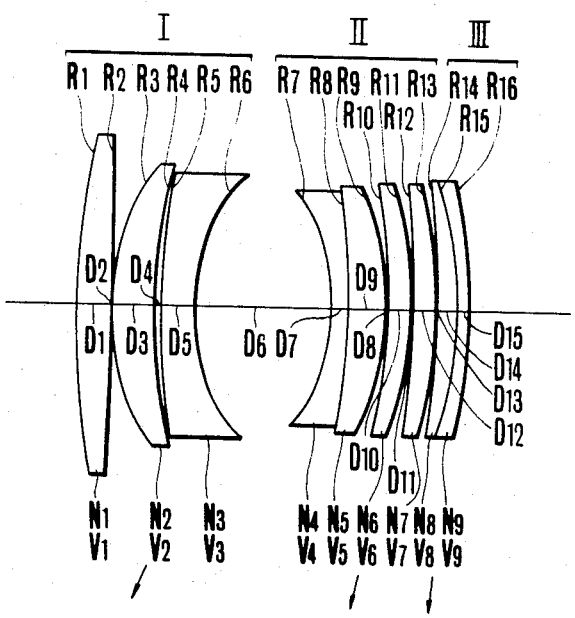
Figure 2B:
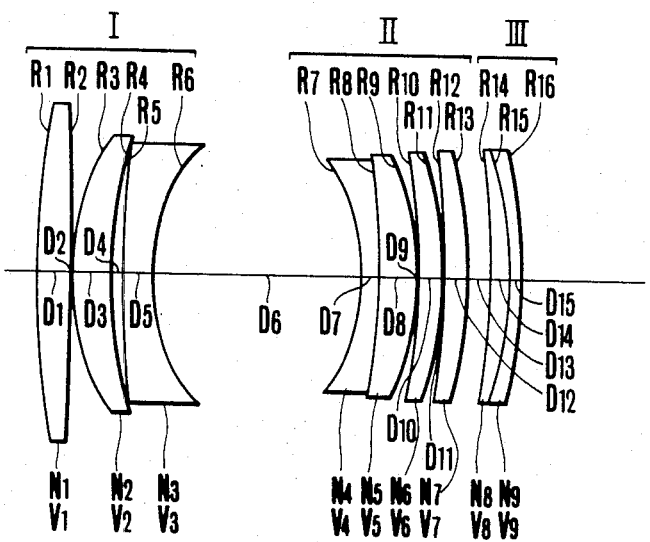
Figure 3A:
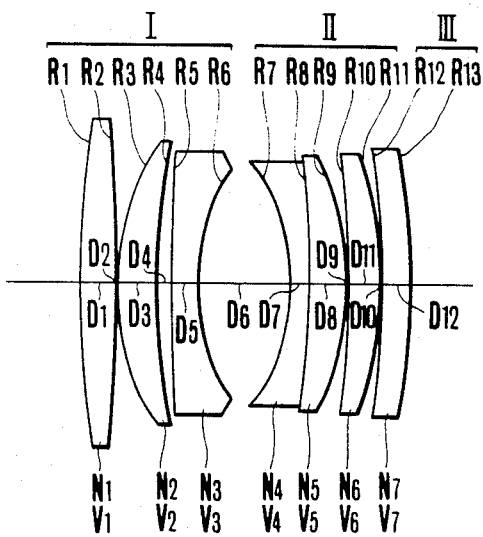
Figure 3B:
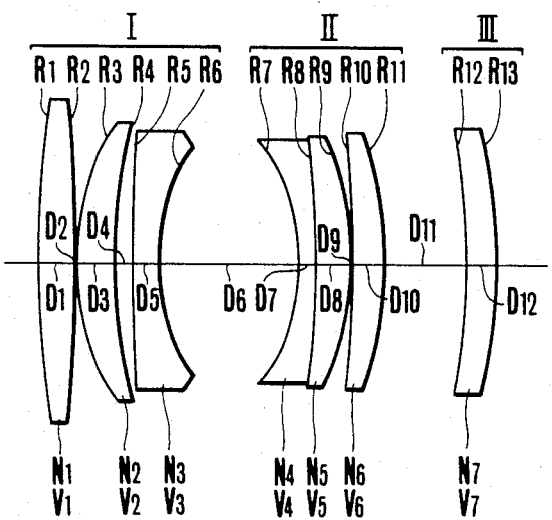

FIGS. 1 to 3 in longitudinal sectional views illustrate embodiments 1 to 3 of objective lenses according to the present invention wherein I, II and III denote the 1st, 2nd and 3rd lens groups respectively with (a) representing an operative position of the lens when focused at infinity and (b) when at an image magnification of 0.85.

The objective lens of the invention is constructed from three lens groups of positive power and operates in such a manner that, when focusing from an infinitely distant object to an object at a shorter distance, the speeds of forward movement of the 1st, 2nd and 3rd lens groups are made progressively slower as indicated by arrows in FIGS. 1 to 3. In this manner stability of aberration correction is maintained throughout the extended range of variation of the image magnification. And, a diaphragm is positioned in a space between the 1st and 2nd lens groups, and the 3rd lens group is constructed as including at least one positive lens, whereby the aberrations are well corrected. In the case where the 3rd lens group is in the form of a singlet lens, it is preferred to use a glass material of low dispersion for the purpose of correcting lateral chromatic aberration when in closeup shooting. To facilitate a further improvement of the lateral chromatic aberration at increased magnifications, it is recommended to construct the 3rd lens group from a plurality of lens elements.

In the present invention, though the above-described form of objective lens enables the image aberrations to be maintained stable throughout an extended range of variation of the image magnification, further assistance in the stabilization of the aberrations can be obtained when the following conditions are satisfied:

$$0.12 < \Delta d_1/\Delta S < 0.21 \quad (1)$$

$$0.04 < \Delta d_2/\Delta S < 0.21 \quad (2)$$

$$R_2 < 0 \quad (3)$$

$$N1 < N2 \quad (4)$$

$$40 < \nu1 < 44 \quad (5)$$

wherein $\Delta d_1$ and $\Delta d_2$ are the amounts of variation of the intervals between the 1st and 2nd lens groups and between the 2nd and 3rd lens groups respectively when focusing from an infinitely distant object to close objects; $\Delta S$ is the amount of forward movement of the 3rd lens group; R2 is the radius of curvature of the 2nd lens surface counting from the front; N1 and N2 are the indices of refraction of the glasses from which the 1st and 2nd lens elements are made up respectively; and $\nu1$ is the average Abbe number of the lens elements constituting the 1st lens component.

Among the above-cited conditions, conditions (1) and (2) are the fundamental ones concerning the present invention for good correction of outward coma and spherical aberration when focused to close objects. Condition (3) is to correct negative distortion due to the variation of the image magnification. Conditions (4) and (5) concern the Petzval sum and the achromatism of the 1st lens group.

Condition (1) represents a compromise between the requirements of correcting the outward coma and spherical aberration in the closeup shooting position. As the value of said interval increases, the off-axis ray of light arrives at the 2nd lens group at a higher height of incidence and, therefore, is refracted more strongly by the 2nd lens group to produce inward coma which can be well balanced with the outward coma resulting from the variation of the image magnification. On the other hand, however, the paraxial ray diverges in said space so that as this interval increases, under-correction of spherical aberration results. For this reason, when the upper limit of condition (1) is exceeded, though it is advantageous at the correction of outward coma, the spherical aberration is largely under-corrected. This also causes the focal length to be largely increased. When the lower limit is exceeded, though the range of variation of the spherical aberration is lessened, it is made more difficult to remove the outward coma.

Condition (2) cooperates with condition (1) to contribute a similar effect to the correction of outward coma and the correction of spherical aberration. Since expansion of said interval has a similar advantage to that described in connection with condition (1), its aim is to reduce the deterioration of the various aberrations which would be otherwise caused when the interval $\Delta d_1$ is varied in surplus to account for the variation of the interval $\Delta d_2$, whereby even at extraordinarily high image magnifications the variation of aberrations is limited to a minimum. If a correction of the outward coma is attemped by imparting independent variation only to, for example, the interval $\Delta d_2$ while the interval $\Delta d_1$ of condition (1) is left unchanged during focusing, it will result that the required amount of variation of the interval $\Delta d_2$ becomes very large, and, therefore, that the under-correction of spherical aberration reaches an unacceptable level. Additional drawbacks wherein the outer diameter of the 3rd lens group is increased, and the focal length is considerably increased will also be involved. When the upper limit of condition (2) is exceeded, under-correction of spherical aberration results, and the focal length is increased. When the lower limit is exceeded, the advantage of correcting the outward coma will be lost.

Condition (3) is to limit the negative distortion in the closeup position to a minimum. When this condition is violated, it becomes difficult in any case to perform good correction of negative distortion.

Condition (4) cooperates with condition (5) to well correct the various aberrations. When this condition is violated, achromatization of the 1st lens group, avoidance of a positive large increase of the Petzval sum and removal of coma are difficult to perform. In particular, in order to limit the range of inclination of the image surface resulting from the variation of the image magnification to a minimum, it is required to take the N2 at a high value and to retain the Petzval sum to a small value.

Condition (5) is to achromatize the 1st lens group. In the present invention, every constituent lens element is made up from a relatively high Abbe number, and the satisfaction of the conditions with regard to achromatism is also taken into account. When the upper limit is exceeded, achromatism within the 1st lens group becomes difficult to achieve. On the other hand, the lower limit represents the average Abbe number of the glasses usable in the 1st lens group in view of the refractive indices of the glasses of the positive and negative lenses.

Three examples of specific objective lenses of the invention can be constructed in accordance with the numerical data given in the following tables for the radii of curvature, R, the axial thicknesses and air separations, D, and the indices of refraction, N, and the Abbe numbers, $\nu$, of the glasses of the lens elements, all expressed with the usual subscripts numbered consecutively from front to rear.

| Embodiment 1 | | | |
|---|---|---|---|
| F = 1 FNO = 1:2 2ω = 45.5 | | | |
| R1 = 1.4306 | D1 = 0.0638 | N1 = 1.77250 | ν1 = 49.6 |
| R2 = −5.8384 | D2 = 0.0030 | | |
| R3 = 0.4423 | D3 = 0.0876 | N2 = 1.79952 | ν2 = 42.2 |
| R4 = 0.8928 | D4 = 0.0155 | | |
| R5 = 2.4975 | D5 = 0.0597 | N3 = 1.69895 | ν3 = 30.1 |
| R6 = 0.3489 | D6 = Variable | | |
| R7 = −0.3137 | D7 = 0.0309 | N4 = 1.67270 | ν4 = 32.1 |
| R8 = −0.8855 | D8 = 0.0633 | N5 = 1.77250 | ν5 = 49.6 |
| R9 = −0.4636 | D9 = 0.0031 | | |
| R10 = −2.2632 | D10 = 0.0453 | N6 = 1.77250 | ν6 = 49.6 |
| R11 = −0.5787 | D11 = Variable | | |
| R12 = −1.6914 | D12 = 0.0329 | N7 = 1.56873 | ν7 = 63.1 |
| R13 = −0.7423 | D13 = 0.0252 | N8 = 1.69895 | ν8 = 30.1 |
| R14 = −0.9305 | | | |
| Reproduction | | | |

-continued

| Ratio | D6 | D11 |
|---|---|---|
| $\beta = 0.0$ | 0.1699 | 0.0031 |
| $\beta = -0.85$ | 0.2993 | 0.1248 |

$\frac{\Delta d_1}{\Delta S} = 0.14$ $\frac{\Delta d_2}{\Delta S} = 0.15$

Embodiment 2

$F = 1 \quad FNO = 1:2 \quad 2\omega = 45.5$

| | | | |
|---|---|---|---|
| R1 = 1.2261 | D1 = 0.0638 | N1 = 1.72600 | ν1 = 53.5 |
| R2 = −12.3375 | D2 = 0.0030 | | |
| R3 = 0.4270 | D3 = 0.0736 | N2 = 1.83481 | ν2 = 42.7 |
| R4 = 0.9051 | D4 = 0.0136 | | |
| R5 = 1.4972 | D5 = 0.0504 | N3 = 1.74950 | ν3 = 35.3 |
| R6 = 0.3177 | D6 = Variable | | |
| R7 = −0.3133 | D7 = 0.0310 | N4 = 1.64769 | ν4 = 33.8 |
| R8 = −1.0252 | D8 = 0.0633 | N5 = 1.77250 | ν5 = 49.6 |
| R9 = −0.5022 | D9 = 0.0031 | | |
| R10 = −1.0510 | D10 = 0.0453 | N6 = 1.77250 | ν4 = 49.6 |
| R11 = −0.5850 | D11 = 0.0031 | | |
| R12 = −1.3557 | D12 = 0.0388 | N7 = 1.69680 | ν7 = 55.5 |
| R13 = −0.7731 | D13 = Variable | | |
| R14 = −1.5200 | D14 = 0.388 | N8 = 1.61800 | ν8 = 63.4 |
| R15 = −0.6047 | D15 = 0.0213 | N9 = 1.84666 | ν9 = 23.9 |
| R16 = −0.7460 | | | |

| Reproduction Ratio | D6 | D13 |
|---|---|---|
| $\beta = 0.0$ | 0.2524 | 0.0031 |
| $\beta = -0.85$ | 0.4257 | 0.0464 |

$\frac{\Delta d_1}{\Delta S} = 0.2$ $\frac{\Delta d_2}{\Delta S} = 0.05$

Embodiment 3

$F = 1 \quad FNO = 1:2 \quad 2\omega = 45.5$

| | | | |
|---|---|---|---|
| R1 = 1.8432 | D1 = 0.0638 | N1 = 1.77250 | ν1 = 49.6 |
| R2 = −4.0060 | D2 = 0.0030 | | |
| R3 = 0.4332 | D3 = 0.0678 | N2 = 1.79952 | ν2 = 42.2 |
| R4 = 0.9612 | D4 = 0.0294 | | |
| R5 = 3.3725 | D5 = 0.0484 | N3 = 1.69895 | ν3 = 30.1 |
| R6 = 0.3621 | D6 = Variable | | |
| R7 = 0.3308 | D7 = 0.0309 | N4 = 1.67270 | ν4 = 32.1 |
| R8 = −1.4750 | D8 = 0.0633 | N5 = 1.77250 | ν5 = 49.6 |
| R9 = −0.4709 | D9 = 0.0031 | | |
| R10 = −2.7852 | D10 = 0.0581 | N6 = 1.77250 | ν6 = 49.6 |
| R11 = −0.6416 | D11 = Variable | | |
| R12 = −1.7231 | D12 = 0.0543 | N7 = 1.56873 | ν7 = 63.1 |
| R13 = −1.0557 | | | |

| Reproduction Ratio | D6 | D11 |
|---|---|---|
| $\beta = 0.0$ | 0.1659 | 0.0029 |
| $\beta = -31\ 0.85$ | 0.2652 | 0.1595 |

$\frac{\Delta d_1}{\Delta S} = 0.12$ $\frac{\Delta d_2}{\Delta S} = 0.20$

The various aberrations of the objective in embodiment 1 with an object at infinity and at a reproduction ratio of 0.85 are illustrated in FIGS. 4-a to d and FIGS. 5-a to d respectively.

The various aberrations of the objective in embodiment 2 with an object at infinity and at a reproduction ratio of 0.85 are illustrated in FIGS. 6-a to d and FIGS. 7-a to d respectively.

The various aberrations of the objective in embodiment 3 with an object at infinity and at a reproduction ratio of 0.85 are illustrated in FIGS. 8-a to d and FIGS. 9-a to d respectively.

In the drawings, S designates the sagittal image surface, M the meridional image surface and Y the image height.

What is claimed is:

1. A large relative aperture objective lens including:
   (a) a first component having a positive refractive power;
   (b) a second component arranged on the image side of said first component and having a positive refractive power; and
   (c) a third component arranged on the image side of said second component and having a positive refractive power,
whereby as focusing is effected down from infinity to shorter object distances, said first, second and third components move axially toward the object, wherein the speed of movement of said first component is faster than that of movement of said second component, and the speed of movement of said second component is faster than that of movement of said third component.

2. A large relative aperture objective lens according to claim 1, satisfying the following conditions:

$$0.12 < \Delta d_1/\Delta S < 0.21 \quad (1)$$

$$0.04 < \Delta d_2/\Delta S < 0.21 \quad (2)$$

$$R_2 < 0 \quad (3)$$

$$N1 < N2 \quad (4)$$

$$40 < \nu_I < 44 \quad (5)$$

where $\Delta d_1$, $\Delta d_2$ and $\Delta S$ are respectively the amounts of variation of the air separations between the first and second lens components and between the second and third lens components and the amount of forward movement of the third lens component when focusing from an infinitely distant object to close objects; R2 is the radius of curvature of the second lens surface counting from the front; N1 and N2 are the refractive indices of the glasses of the first and second lens elements respectively; and $\nu_I$ is the average Abbe number of the lens elements constituting the first lens component.

* * * * *